Oct. 20, 1925.
J. A. EDEN, JR
1,558,441
BOLT MACHINE
Filed Oct. 30, 1923
9 Sheets-Sheet 3
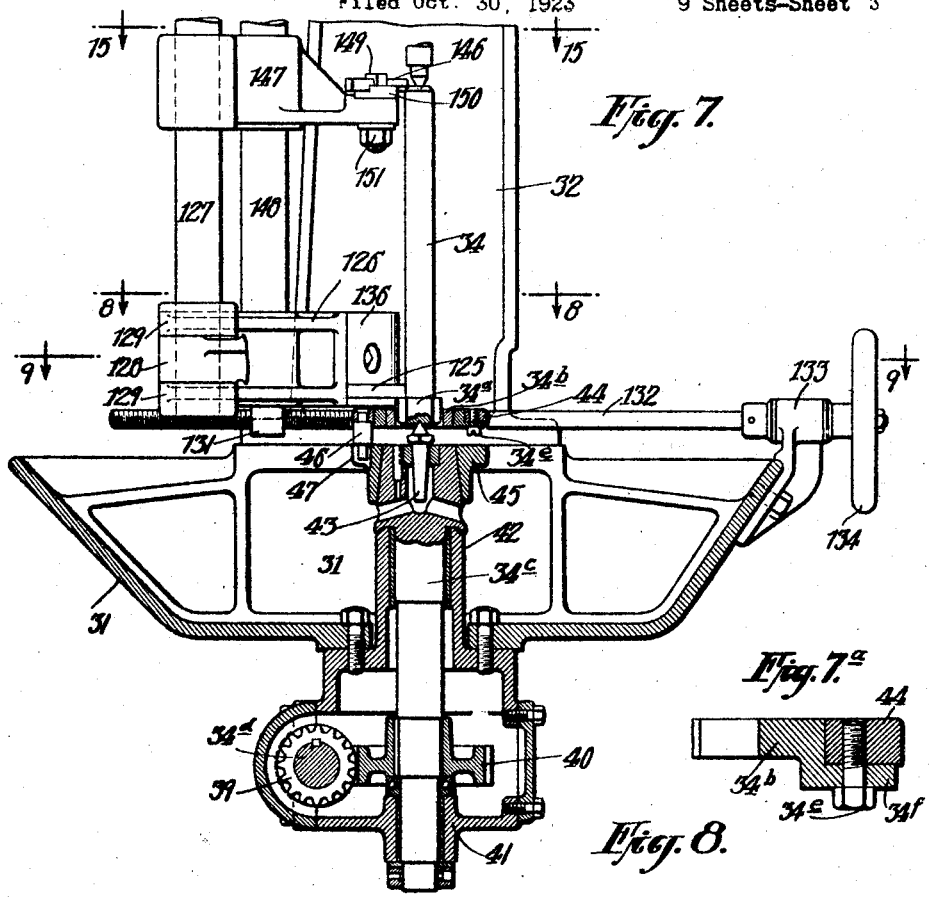
Fig. 7.
Fig. 7.ª
Fig. 8.
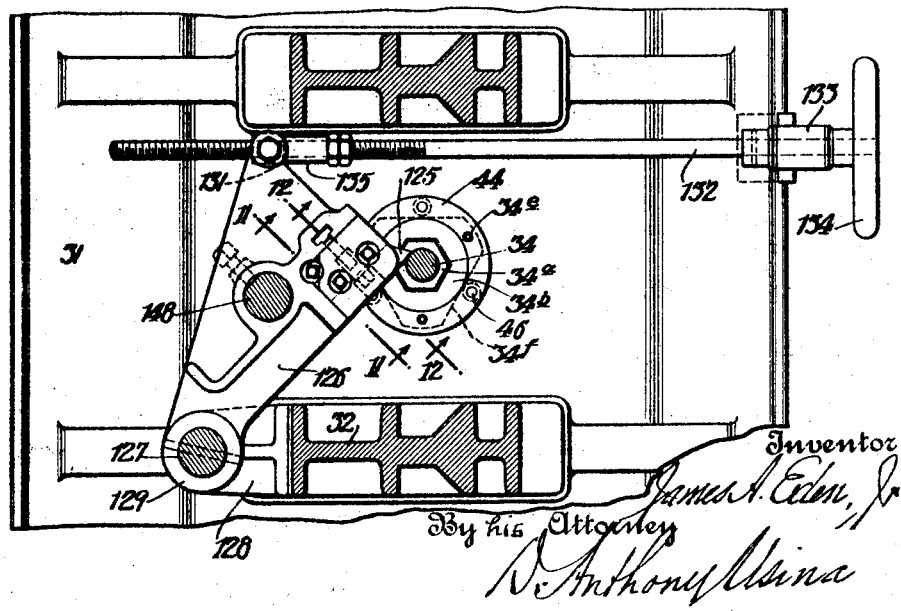
Inventor
James A. Eden, Jr.
By his Attorney
N. Anthony Ulina Oct. 20, 1925.  
J. A. EDEN, JR  
1,558,441  
BOLT MACHINE  
Filed Oct. 30, 1923  
9 Sheets-Sheet 4
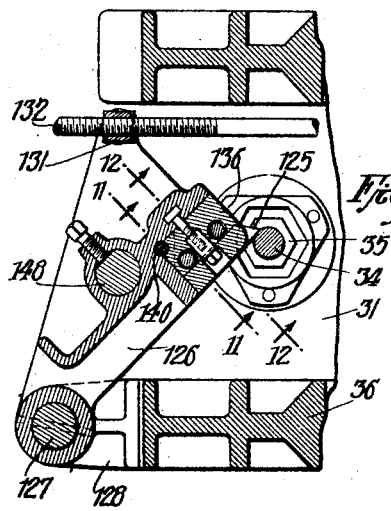
Fig. 9.
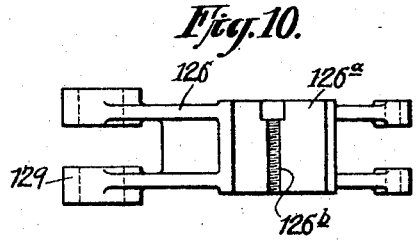
Fig. 10.
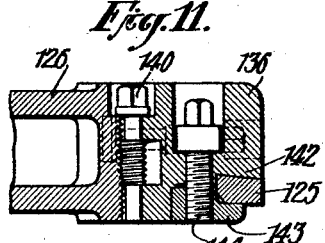
Fig. 11.
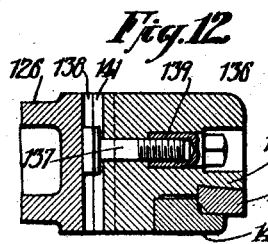
Fig. 12.
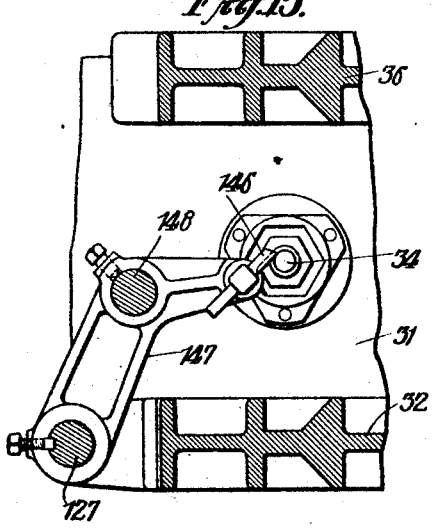
Fig. 15.
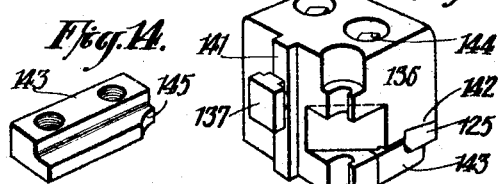
Fig. 14. Fig. 13.
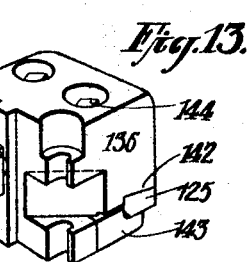
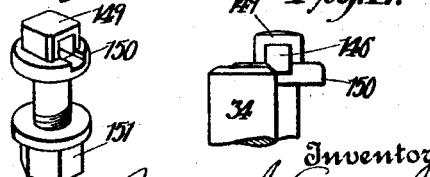
Fig. 16. Fig. 17.
Inventor  
James A. Eden, Jr.  
By his Attorney  
D. Anthony Usina Oct. 20, 1925.

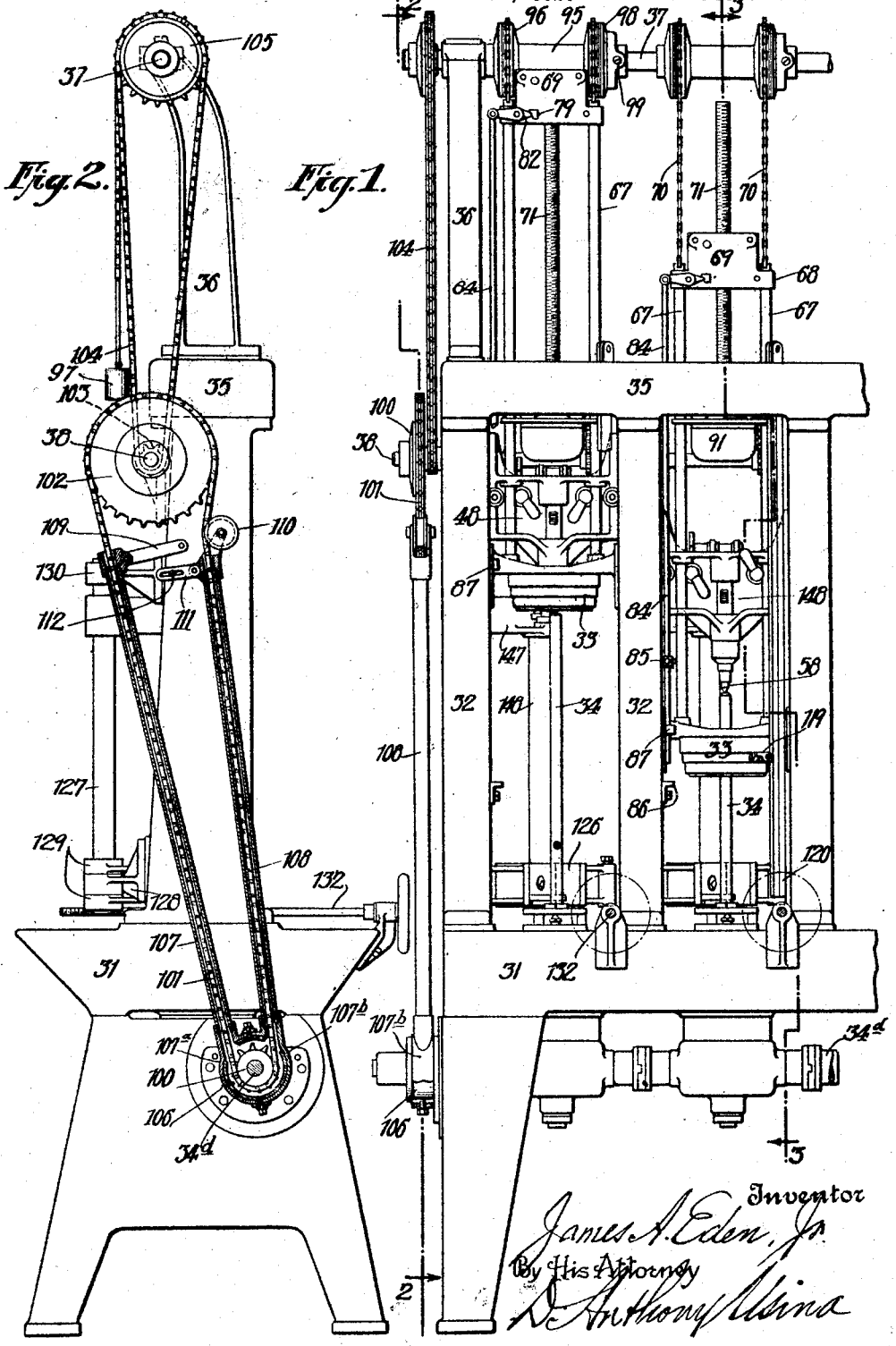

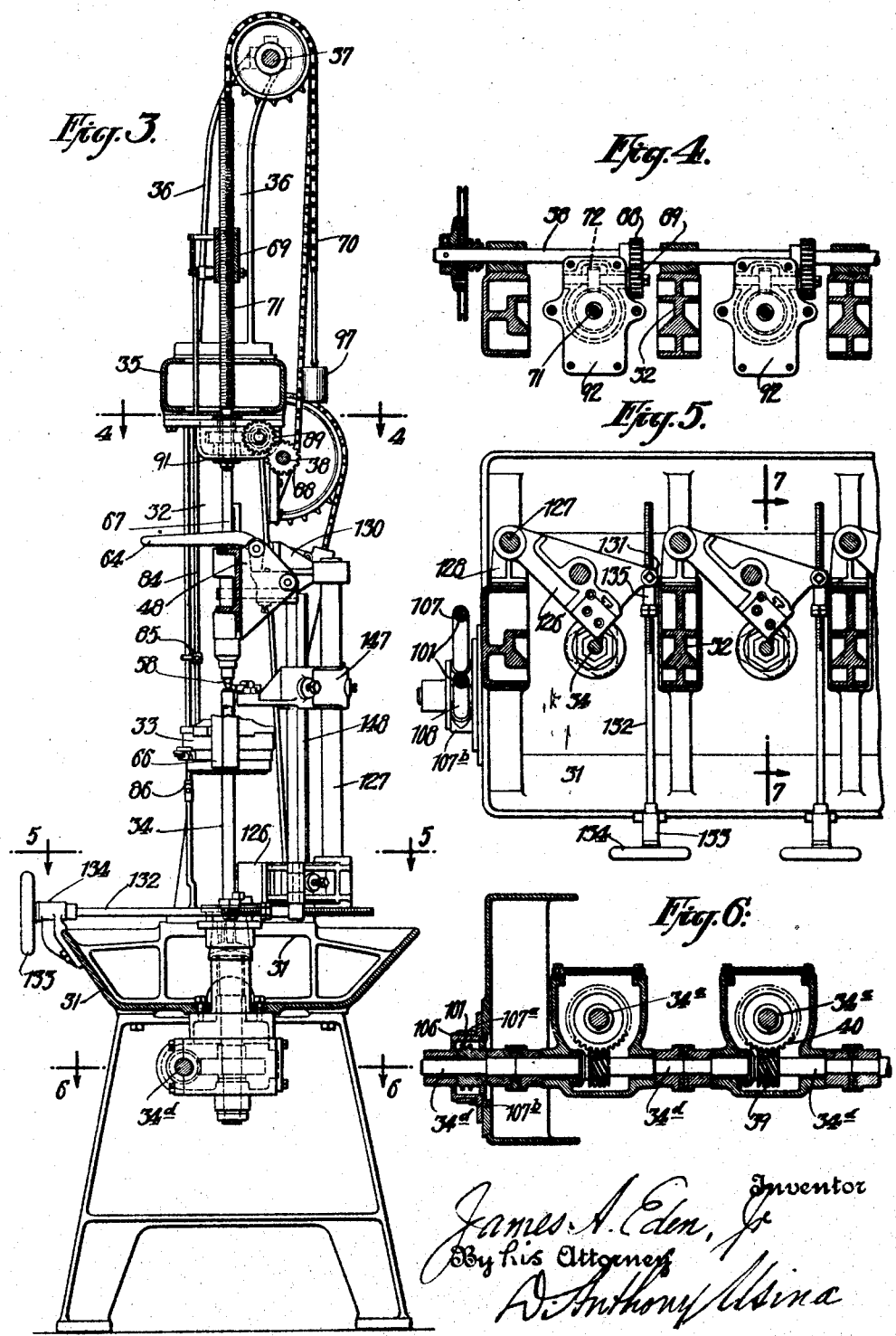

J. A. EDEN, JR

BOLT MACHINE

Filed Oct. 30, 1923

Inventor
James A. Eden, Jr.
By his Attorney
D. Anthony Usina

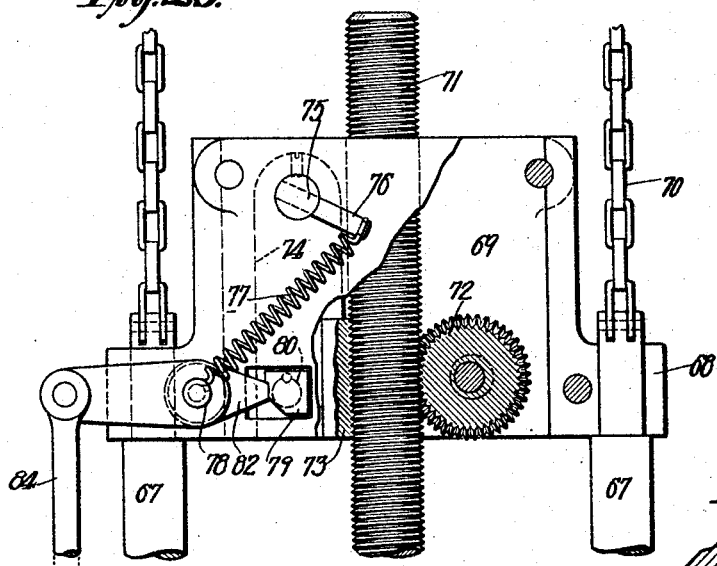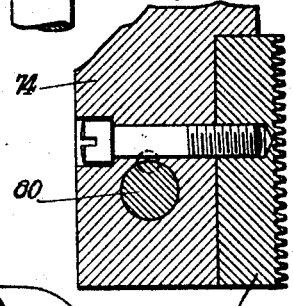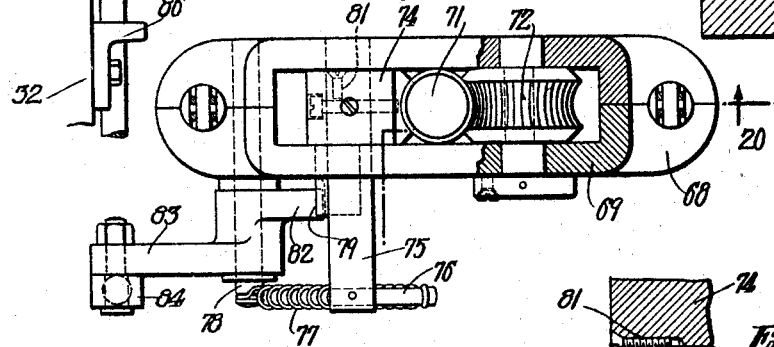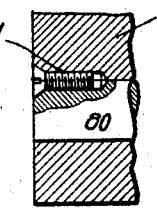

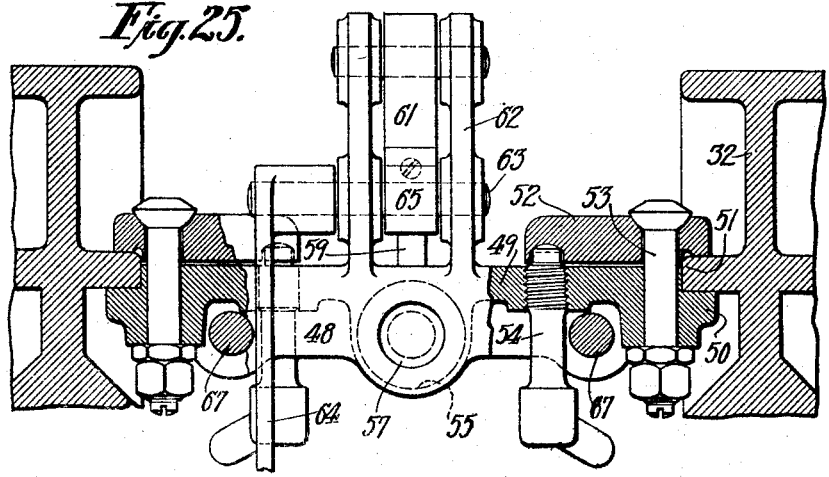
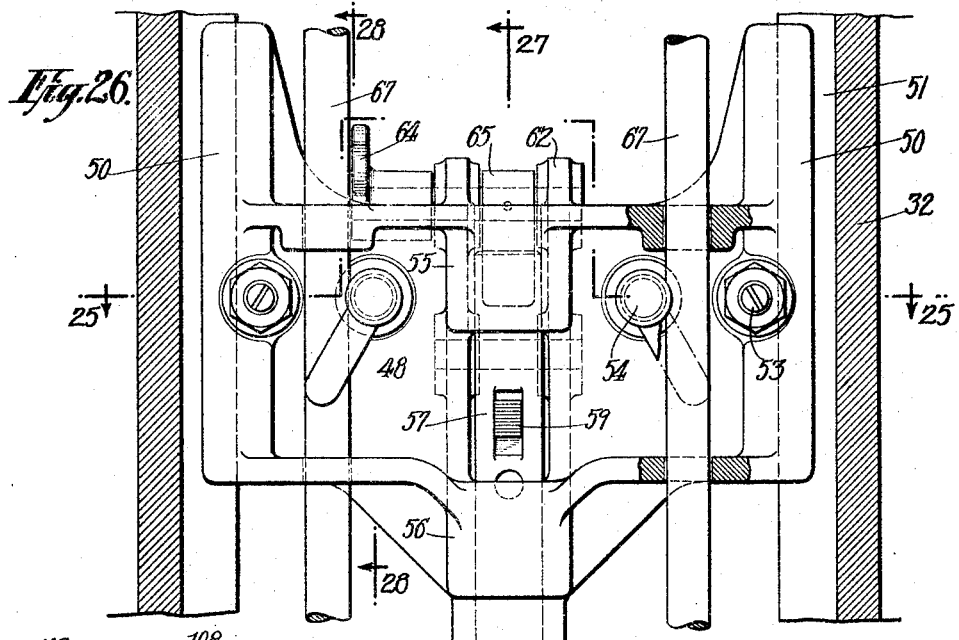
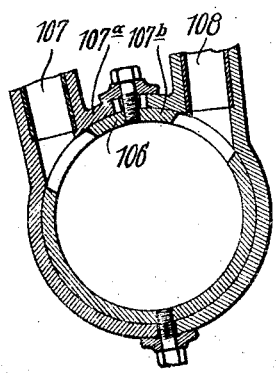

Oct. 20, 1925.  
J. A. EDEN, JR  
1,558,441  
BOLT MACHINE  
Filed Oct. 30, 1923    9 Sheets-Sheet 8

Inventor  
James A. Eden, Jr  
By his Attorney  
D. Anthony Usina

Oct. 20, 1925. 1,558,441
J. A. EDEN, JR
BOLT MACHINE
Filed Oct. 30, 1923  9 Sheets-Sheet 9

Patented Oct. 20, 1925.

1,558,441

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

BOLT MACHINE.

Application filed October 30, 1923. Serial No. 671,652.

*To all whom it may concern:*

Be it known that I, JAMES A. EDEN, Jr., a citizen of the United States, residing in Springfield, Massachusetts, have invented certain new and useful Improvements in Bolt Machines, of which the following is a specification.

My invention aims to provide improvements in various parts of machines used for turning or threading bolts and particularly in the manufacture of taper bolts, such as the stay-bolts in locomotives.

The accompanying drawings illustrate a machine embodying the invention.

Fig. 1 is a front elevation showing two units or machines in a single stand;

Fig. 2 is a side elevation of the same, partly in section on the line 2—2 of Fig. 1;

Fig. 3 is a vertical section, partly in elevation, substantially on the line 3—3, Fig. 1;

Figs. 4, 5 and 6 are horizontal sections substantially on the correspondingly numbered lines in Fig. 3;

Fig. 7 is a vertical section of the lower part of a machine substantially on the line 7—7 of Fig. 5;

Figure 18:
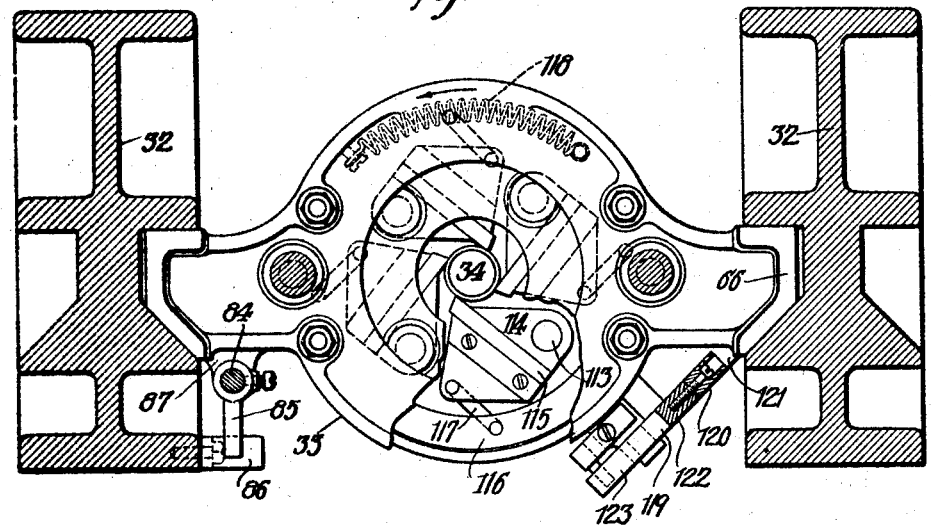
Figure 19:
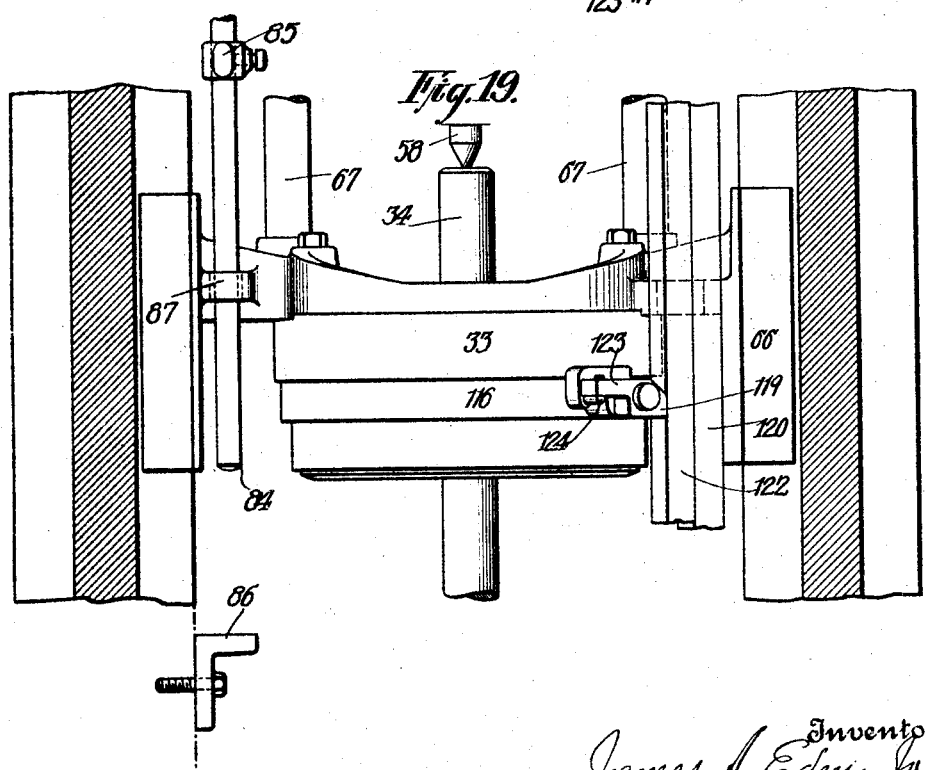
Figure 27:
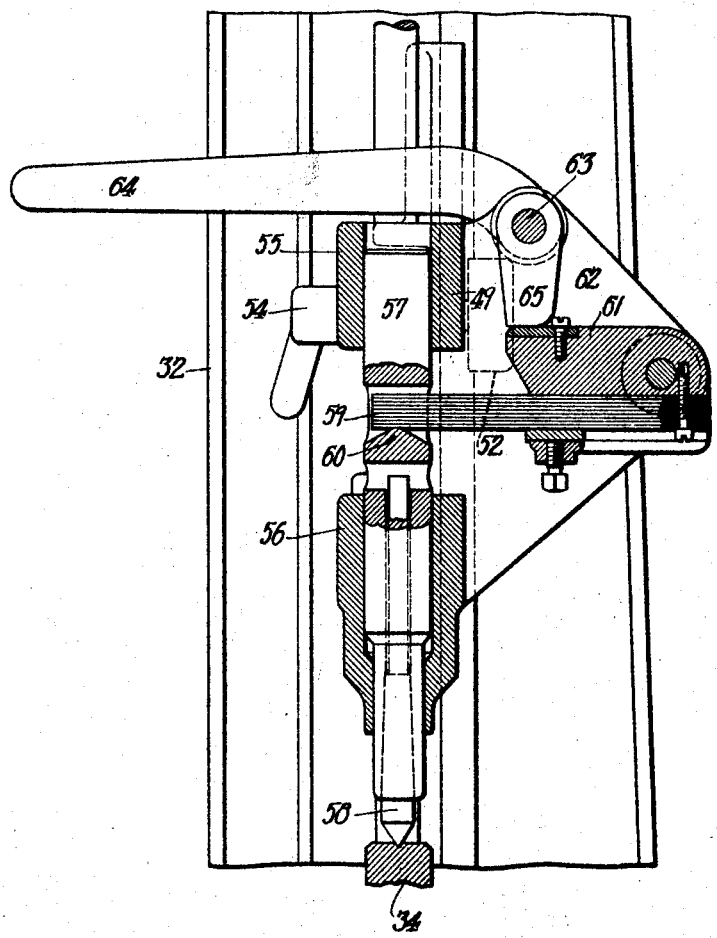
Figure 28:
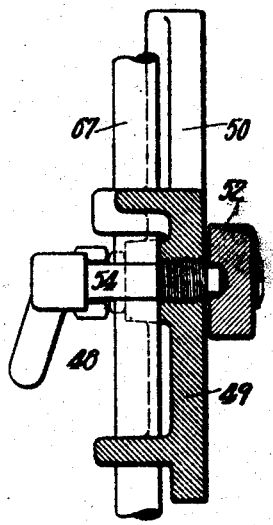
Figure 29:
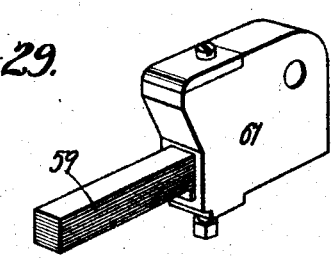
Figure 30:
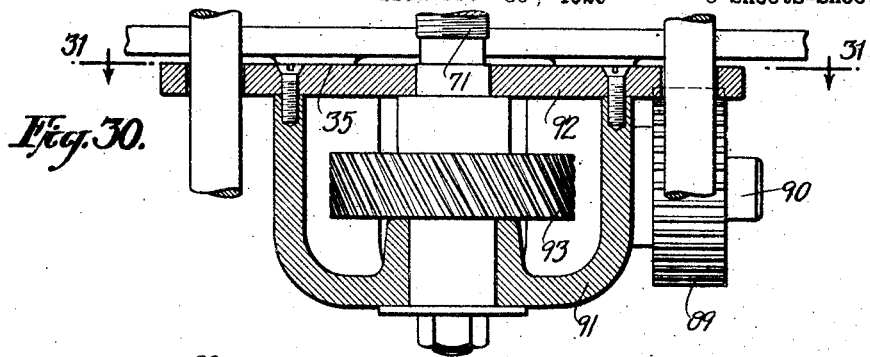
Figure 31:
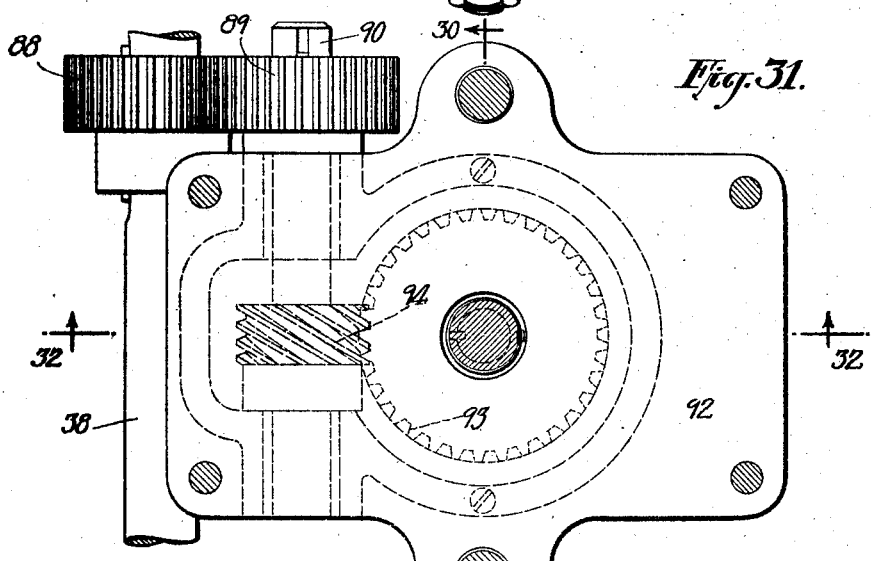
Figure 32:
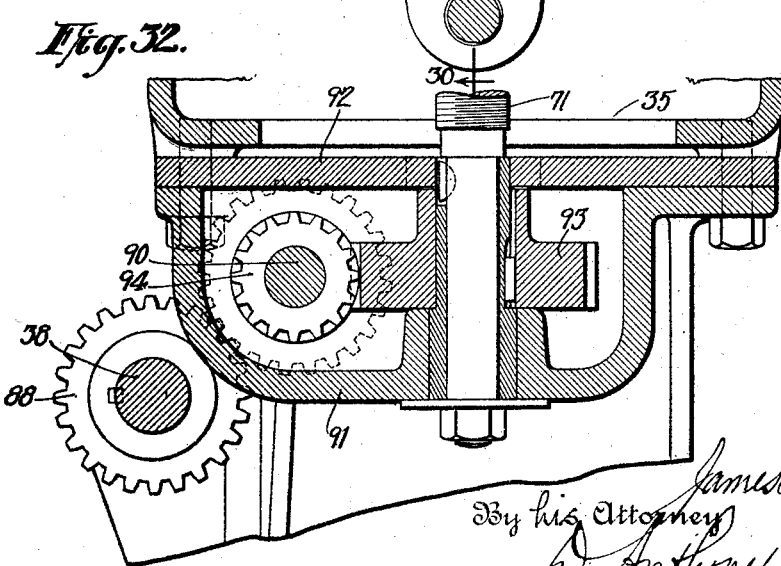

Fig. 7$^a$ is an enlarged view of parts shown in Fig. 7;

Fig. 8 is a horizontal section on the line 8—8 of Fig. 7;

Fig. 9 is a horizontal section of a cutter for facing the head of the bolt, the plane of section being indicated by the line 9—9, Fig. 7;

Fig. 10 is a front elevation of the holder for the facing tool;

Figs. 11 and 12 are vertical sections on the correspondingly numbered lines of Fig. 9;

Fig. 13 is an isometric view of the block which carries the facing cutter;

Fig. 14 is a similar view of a holding device for the facing cutter;

Fig. 15 is a plan of a holder and cutter for pointing the end of the blank; and Figs. 16 and 17 are details of the same;

Fig. 18 is a broken plan of a cutter-head; and Fig. 19 is a front elevation of the same;

Fig. 20 is a front elevation, partly in section, of the mechanism for feeding the cutter-head;

Fig. 21 is a plan of the same partly in elevation; and Figs. 22, 23 and 24 are details thereof;

Figs. 25 and 26 are respectively a plan and front elevation, partly in section, of the clamping means for holding the blank in position, the former being taken on the plane of section indicated at 25—25 in Fig. 26; and Fig. 26$^a$ is an enlarged detail of Fig. 2;

Figs. 27 and 28 are vertical sections of the same approximately on the correspondingly numbered lines in Fig. 26; and Fig. 29 is a detail of the same;

Fig. 30 is a front elevation of the gearing shown in Fig. 4 for feeding the cutter-head, the casing being in section on the line 30—30 of Fig. 31;

Fig. 31 is a plan of the same taken on the line 31—31 of Fig. 30;

Fig. 32 is a vertical section of the same on the line 32—32 of Fig. 31.

Figure 33:
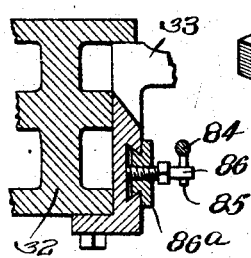

Fig. 33 illustrates a modification.

The machine comprises a base 31 supporting uprights 32 which constitute guides for the traveling cutter-heads 33 which travel down over the bolt blanks 34 to turn the latter to the cylindrical or tapered shape required; or the cutter-heads may carry chasers or threading tools for forming threads on the blank. In Fig. 1, I have shown two units of my machine operating on two bolt blanks. The machine usually carries several such units, and they may be used for different operations. A cross-head 35 at the tops of the uprights 32 supports end uprights 36 across which extends a shaft 37 for retracting the cross-heads. At the back of the machine slightly below the cross-head 35 there extends a feed shaft 38 by means of which the heads are fed down on the work. The blanks 34 have their heads 34$^a$ (Figs. 7 and 8) resting in sockets 34$^b$ on the upper ends of driving spindles 34$^c$ by which the blanks are rapidly rotated as the cutters are fed down on them. The main shaft 34$^d$ is located below the base 31 and actuates the driving spindles, the feed shaft and the retracting shaft through connections hereinafter described.

Figs. 6, 7 and 8 illustrate the connections to the driving spindles. The main shaft 34$^d$ comprises a number of sections, one for each of the units of the machine, coupled together in line (see Fig. 6) and each carrying a worm 39 which engages a worm gear 40 on the lower end of the driving spindle 34$^c$. The latter is mounted in a bearing 41 in the bottom of the gear casing and in an upper bearing 42 in the panshaped base 31. At its upper end it carries a centering pin 43 loosely mounted in a socket therein; the upper end of the spindle is apertured as illustrated to shed dirt, oil, chips or the like. The center pin 43 enters a depression in the head of the blank to center the latter. The hexagonal head of the blank is surrounded and engaged by a ring 34$^b$ as previously explained, and the latter is carried by means of screws 34$^e$ passing through flanges 34$^f$ in a ring 44 which is carried loosely on a head 45 having a tapered fit on the upper end of the driving spindle 34$^c$. Three pins 46 carried by the ring 44 have their reduced lower ends in slots 47 in the head 45. Thus the pins 46 hold the ring 44 and the socket 34$^b$ slightly above the head of the spindle, while communicating to it the rotary movement of the spindle. The play of the lower ends of the pins in the slots 47 permits a slight floating or lateral movement of the ring 44 with relation to the spindle, so as to accommodate the blank heads 34$^a$ which may be more or less off center.

The blanks are centered and held at their upper ends by means of centering apparatus illustrated in detail in Figs. 25 to 29. The centering head is indicated as a whole by the numeral 48. It comprises a web 49, (Fig. 25) extending between the uprights 32 and having shouldered ends 50 which bear against the front of ribs 51 on said uprights. On the rear face of each web at each end there is located a clamping lever 52 held loosely in place by a bolt 53, the outer end of the clamping lever 52 bearing against the rear face of the rib 51. Bearing against the inner end of each clamping lever is a clamping bolt 54 threaded through the web 49 and having a handle on its front end. The operator can release the centering head by slightly unscrewing the two bolts 54, thus permitting the centering head to be moved to a new position when the length of the blanks to be turned is changed.

On the front face of the web 49 there is a pair of bosses 55 and 56 in line with each other and carrying a holder 57 in the lower end of which is mounted the pointed centering pin 58 engaging a conical centering recess or depression in the top of the blank 34. The holder 57 has a transverse opening into which projects a leaf-spring 59 bearing on a rocking shoulder 60 and fastened at its rear end in a block 61 which is pivoted between a pair of ears 62 projecting from the rear of the plate 49. A rocking shaft 63 is carried in the upper parts of the ears 62 and has an operating arm 64 extending to the front of the machine. The shaft 63 carries also an arm 65 bearing on a wear plate on the block 61. The handle 64 is lifted to release the pressure of the spring on the centering pin when the entire centering device is first lowered into engagement with the blank. Thereafter the handle 64 is pulled down and through the arm 65 presses the spring down to hold the centering pin 58 in firm engagement with the blank during the subsequent operations. To take out a finished blank and insert a new one of the same length it is only necessary to lift the handle 64; whereupon the blank can be lifted, pushing up the pin 58, and withdrawing the head from the socket below, and a new blank can be similarly introduced and clamped by a downward movement of the handle.

The cutter-heads, indicated as a whole by the number 33, are provided with elongated wings 66 (Figs. 18 and 19) for guiding the same in the grooves of the uprights 32. Each head is supported on the lower ends of a pair of rods 67 which extend upward through openings in the centering head 48, so as to allow the latter to move independently of the cutter-head. Thence the supporting rods 67 extend up through the cross-head 35 of the machine frame and through ears 68 at the sides of the split frame 69 carrying the feed nut hereinafter referred to. The rods 67 have shoulders engaging the undersides of the casing 69, and at their upper ends are connected to chains 70 by which the heads are retracted as hereinafter described.

The heads are advanced by forcing down the casing 69 bearing on the shouldered ends of the rods 67. For this purpose a continuously rotating threaded shaft 71 is used extending above the cross-head 35 and driven from its lower end. The threaded shaft 71 engages an idler 72 (Fig. 20) adjustably mounted in the casing 69 and, at the opposite side, a segmental nut 73 which is pressed into engagement with the shaft when a cutting movement is desired; and which at other times is retracted from engagement with the shaft. The segmental nut is fastened in the lower end of an arm 74 (see detail Fig. 22) which is pivoted at its upper end between the two halves of the casing 69, its pivot pin 75 having an arm 76 connected by a spring 77 to a fixed shaft 78 and tending to retract the arm 74 and the segmental nut from engagement with the threaded shaft. The arm 74 carries near its lower end a lateral tripping block 79 projecting through an opening in the casing, by means of which the nut is forced into engagement with the shaft at the proper time. The tripping block is located on the end of a shank 80 which passes through the arm 74 as shown in Fig. 23 and is locked by a screw 81 engaging its rear end.

The block 79 is advanced or released by means of a rocking arm 82 mounted on the pin 78 which carries a second arm 83 pivotally connected to the upper end of a tripping rod 84 which extends downward and the tripping rod carries a collar 85 adjustable along the same and moving in the path of a stop 86 mounted on one of the uprights 32 of the frame of the machine. See Figs. 1 and 20. The lower end portion of the rod is held in a guide 87 on the head 33. In the left-hand unit of Fig. 1 the lower part of the rod 84 is omitted to illustrate better the parts in the rear thereof. The retracting mechanism has raised the cutter and the casing 69 to its uppermost position, the segmental feed nut having been disengaged from the screw shaft 71. In this position, a new blank being inserted and centered, the operator pulls down the rod 84 and swings the locking arm 82 upward. The latter engaging the inclined face of the block 79 and then the straight face thereof, has pushed the block in and locked it and the segmental nut. The continuing rotation of the shaft 71 commences then to feed the cutter-head and connected parts downward.

The right-hand unit in Fig. 1 shows the head in an intermediate position, moving downward. At the end of the operation the tripping block 85 on the lower end of the rod 84 will strike the stop 86 pushing the rod upward and releasing the segmental nut, which will be withdrawn by its spring, leaving the parts free from operative engagement with the feed shaft 71, whereupon the cutter-head will be lifted through the chains 70 as later described in more detail. The tripping member 85 might equally well be rigidly fixed on the rod 84 and stop 86 be mounted on a slide 86a adjustable on the frame of the machine as shown in Fig. 33.

The vertical threaded shafts 71 for the several units are driven from the common feed shaft 38 previously referred to which is located on the rear side of the machine. See Fig. 4. The shaft 38 carries at intervals adjacent to the successive units gears 88 each engaging a gear 89 on the end of a shaft 90 located within a casing comprising a bottom portion 91 and a top plate 92 which are united to each other and fastened on the underside of the cross-head 35 by bolts as indicated in Figs. 30 to 32, so that the upward re-action on the shaft 71 as it forces the cutter-head downward will be taken by the heavy cross-head 35. The vertical shaft 71 is mounted in bearings in the casings 91 and 92 and carries, within said casing, a gear 93 which is driven by a worm 94 on the shaft 90. The cross-head 35 has vertical openings to accommodate the nuts and casings 69 and connected parts, so that they may move downwardly as far as the top plate 92 of the gear casing; thus providing a long stroke without unduly extending the total height of the machine.

This arrangement of the feed shaft 71, with its feed portion extending above the cross-head and with its drive at the lower end, permits the location of the cross-head shortly above the uppermost position of the reciprocating parts of the machine so as to secure a stiff frame-work with a practically indefinite extension of the threaded shaft 71 above the cross-head and a stroke of practically unlimited length.

The retracting shaft 37 is located at such a height as to permit the full upward stroke of the nut casing 69. It carries for each unit a drum 95 on the ends of which are keyed sprocket wheels 96. The two chains 70 of each unit pass over these connected sprockets to counter-weights 97. The drums are mounted rotatably on the shaft and are held between friction rings carried on the inner faces of discs 98 which are adapted to be set up against the outer faces of the sprockets to a greater or less extent and fastened in the desired position of adjustment by set screws 99 engaging the shaft. The friction will be adjusted to such a point that when the feed mechanism is released the turning of the shaft 37 will turn the sprockets and will lift the cutter-heads. The friction however is such as not to oppose any effective resistance to the feeding operation. When, at the end of an upward stroke, the segmental nut is brought into engagement with the shaft 71, the cutter-head will be forced downward and the chains 70 will turn the sprockets 96 backward against the frictional resistance.

The shafts 37 and 38 are driven from the main shaft 34d. For this purpose the latter extends beyond one end of the machine (Fig. 2) and carries a sprocket 100 driving a sprocket chain 101 which passes over a larger sprocket 102 on the end of the main feed shaft 38; which carries a smaller sprocket 103 driving a sprocket chain 104 which passes over a larger sprocket 105 carried on the end of the retracting shaft 37. The speed of the main feed shaft 38 is therefore reduced from that of the main shaft 34d, and the speed of the retracting shaft 37 is still further reduced. The sprocket and chain on the end of the shaft 34d are enclosed in a casing 106 and tubes 107 and 108 extending upward therefrom to enclose the lower portions of the sprocket chain 101 so as to protect it from dirt and particles of metal. This protection extends to a point slightly above the top of the work. The tube 107 is fastened to the casing at its upper end by a link 109. The tube 108 carries at its upper end a roller 110 bearing against the outside of the chain. A link 111 connects the upper end of this tube with the frame of the machine and is provided with a slot through which passes a clamping screw 112 for setting it at any desired position of adjustment. The tubes 107 and 108 are mounted on segments 107ª and 107ᵇ clamped on ring 106 so as to permit such adjustment within the slight range necessary. By this adjustment the roller 110 is caused to slack or maintain the tension of the chain.

The cutter-head may be of any usual design such for example as that illustrated in my co-pending application No. 671,653 filed October 30, 1923. It may also be arranged to carry chasers which cut threads on the work, or to turn the work to a cylindrical or to a tapered or otherwise profiled shape. Figs. 18 and 19 illustrate the principal parts of a suitable cutter-head.

Between the top and bottom plates there are pivoted pins 113 carying holders 114 for the cutting tools 115 which bear against the sides of the blank 34. A ring 116 is arranged rotatably between the top and bottom of the cutter-head and carries the outer ends of toggle links 117, whose inner ends are connected to the blocks 114, so that as the ring is turned, the cutters will be thrown inward to engage the work and to cut it to a desired diameter, or will be thrown outward to clear the work when the cutter-head is to be retracted. A spring 118 within the casing serves to turn the link to the left in the direction of the arrow adjacent thereto so as to open the cutters. For closing them, a tumbler 119 is mounted on the front of the ring 116 in position for engagement by a suitable bar or stop extending down alongside of the tumbler. The construction is described more fully and claimed in a pending application of Kindervater No. 647,969 filed June 27th, 1923. In that application particular reference is made to a profile bar for turning a tapered bolt, but I have illustrated it herein in connection with a vertical guiding bar to produce a cylindrical bolt. A supporting bar 120 is pivotally suspended from the cross-head (see Fig. 1) and bears at its right-hand rear face against a shoulder 121 (Fig. 18) on an arm on the cutter-head. On the face of the supporting bar 120 is fastened a profile bar 122 which bears directly against the end of the tumbler and holds it and the ring 116 in the desired position of adjustment against the pressure of the spring. The tumbler has a tail 123 which during the downward movement of the cutter-head bears against a stop 124 mounted on the same bracket which carries the pivot of the tumbler. The lower end of the profile bar 122 is at such a level that when the cutter has advanced to the desired limit the tumbler will pass beyond the profile bar and the spring will be permitted to throw it to the right, opening the cutters just before the feed nut is released. Upon such release the retracting mechanism will lift the cutter. The tumbler striking the end of the profile bar will be tilted and will permit the upward movement without again closing the cutters on the work. Or, if the feed nut be released before the tumbler passes the end of the profile bar, the upward movement of the head and the friction of the tumbler against the bar will tilt the tumbler and permit the opening of the cutters.

In addition to the cutters which travel lengthwise, I provide also a cutter for facing the head of the blank so as to bring it to the exact thickness desired and to cut a sharp corner at the point where it meets the turned body. I thus avoid the necessity of bringing the traveling cutters down to the exact plane of the face of the bolt head. This is difficult to do accurately, and if such cutters be brought down too far they will break and do injury to the work. The facing cutters are shown in a general plan in Fig. 5 and in detail in Figs. 7 to 14. There is a single facing cutter 125 for each unit of the machine mounted on the end of a rocking arm 126 which is fastened on a shaft 127 mounted on a bracket 128 at its lower end projecting from the rear of the upright 32 of the machine frame. See Fig. 2. The arm 126 has a pair of hubs 129 embracing the bracket 128 by which the shaft is supported, as in Fig. 7. The upper end of the shaft 127 is similarly supported by a bracket 130 extending to the rear of the upright.

The free end of the arm carries a nut 131 connected to it by a vertical pivot and engaging the threaded portion of a shaft 132 which extends through a bearing 133 carried on the front of the machine and has a hand wheel 134 by which it can be turned to swing the arm forward and backward, to bring the facing tool into or out of engagement with the work. The shaft 132 is held in the bearing 133 against longitudinal movement. In order to limit the adjustment of the tool inward, a stop 135 is fixed on the shaft 132 by means of set nuts as illustrated. The facing cutter 125 is of rectangular shape shown in Fig. 7 in face elevation, with a vertical cutting edge (Fig. 9) to engage the shank of the bolt as well as a horizontal lower cutting edge to face the head of the bolt. In cross-section it is of increased width at the rear as shown in Figs. 11 and 12. It is carried in a block 136.

The block is fastened to the rocking arm 126 in the manner illustrated in Fig. 12. A bolt 137 has its head sliding in a vertical groove 138 in a boss in the rocking arm 126 and is engaged by a nut 139 having its head located in a suitable recess in the face of the block. Vertical adjustment is provided by means of a screw 140 (Fig. 11) which is located in grooves in a rear corner of the block and engages a thread in the angle of the rocking arm in which the block is carried. See Fig. 9. The shape of the block 136 is shown in Fig. 13 with a vertical rib 141 fitting the groove 138 guiding the block in its vertical adjustment. This figure shows also the shapes of the grooves which receive and hold the adjusting screw 140. Fig. 10 shows in front elevation the rocking arm 126 with its angular recess 126$^a$ in the corner of which is the thread 126$^b$ to receive the adjusting screw 140. The clamping nut 139 is loosened slightly to permit such vertical adjustment of the block, after which the clamping nut is tightened to hold the block in place.

The block is formed with an under-cut groove 142 on its lower forward edge to receive the cutting tool 125, and the latter is fastened therein by means of a fastening block 143 engaging the underside of the cutter and held by a pair of bolts 144 with their heads located in recesses in the top of the block 136. The fastening block 143 is cut away as at the end 145 (Fig. 14) providing clearance for the head of the bolt below the cutter.

The cutter for tapering or chamfering the end of the blank is shown in Figs. 7 and 15 to 17. This cutter 146 is carried on an arm 147 which is fastened on the same shaft 127 which carries the lower facing tool arm, and is arranged to rock with the latter; the tools being adjusted to engage the blank 34 and perform their work simultaneously. The arms 126 and 147 are also fastened to each other by means of a second rod 148 parallel to the shaft 127. Set screws are used as illustrated to fasten the arm 147 on the shafts 127 and 148, so as to permit vertical adjustment of the arm 147 to accommodate bolts of different lengths. The arm 147 is splined to the shaft 127 so as to be positively rocked thereby when the shaft 127 is rocked by the adjustment of the lower arm carrying a facing cutter in the manner above described.

The chamfering cutter 146 has its body portion rectangular, with its lower forward corner removed to form the cutting edge as in Fig. 17. It is held in a rectangular opening in the square end 149 of a bolt and a washer 150 which rests on the end of the arm 147 as illustrated in Figs. 7 and 16. The shank of the bolt passes through the end of the arm and its lower end is engaged by a nut 151.

The bolt and washer may be turned to set the tool against the work, and will then be clamped in position by the nut 151. In the same setting operation the facing tool 125 will be adjusted in the direction of its length to its final desired position against the work and clamped by the means described. After the turning operation the facing and chamfering tools will be rocked inward to engage the work and finish it at the two points indicated while the cutter-head is lifted above the end of the work, as in the left-hand unit of Fig. 1; and will thereafter be moved backward and out of the path of the cutter-head. There is sufficient clearance below the centering head and the cutter-head, in the raised position of the latter, to permit the chamfering tool to swing into engagement with the work. The finished blank will then be withdrawn and a new one substituted and the centering head brought down upon it and the feeding operation will be commenced by the pulling down of the lower end of the feed controlling rod 84.

The machine of this invention is designed in proportion to the length of the blanks turned, so that for a given vertical space it can take rods or other blanks longer than the ordinary bolts. It provides in fact a machine which can be used for much of the work generally done on horizontal lathes and the several units of the machine are so compactly arranged that a number of them can be provided in the floor space which would be occupied by a single lathe. For example the left-hand unit, Fig. 1, occupies only a fraction of the floor space which would be required for a lathe to take blanks of the length of that shown in this unit; and conversely, several such units could be erected on the floor space which would be required for such a horizontal lathe.

In my pending application for patent for a cutter-head referred to above, the operating devices are mounted in undercut slots formed in gibs mounted on the faces of the upright 32 of the frame. A similar provision may be made in the present machine as indicated in Fig. 33 for carrying controlling devices such as the stop 86 and the profile bar 122 or other device co-operating with the tumbler 119. The provision of such undercut slots permits also the attachment and detachment of various other controlling devices at any desired point in the travel of the head and other moving parts.

Though I have described with great particularity of detail certain embodiments of my invention, yet it is not to be understood therefrom that the invention is restricted to the particular embodiments disclosed. Various modifications thereof in detail and in the arrangement of the parts may be made and the separate features may be used in other combinations by those skilled in the art without departing from the invention as defined in the following claims.

What I claim is:—

1. In a machine of the class described, in combination, a traveling cutter-head, a threaded shaft extending in the direction of travel of the head, a nut attached to the head and engaging said shaft, and driving means for said shaft between the head and the nut.

2. In a machine of the class described, in combination, a cutter-head, upright guides therefor, a cross-head above the travel of the cutter-head, a threaded shaft extending above the cross-head and driven from its lower portion and a nut engaging said shaft and attached to the cutter-head.

3. In a machine of the class described, in combination, a cutter-head, upright guides therefor, a cross-head above the travel of the cutter-head and means extending above the cross-head for giving a feeding movement to the cutter-head.

4. In a machine of the class described, in combination, cutter-head, upright guides therefor, a cross-head above the travel of the cutter-head, a threaded shaft extending above the cross-head and driven from its lower portion and a nut engaging said shaft and attached to the cutter-head and means for withdrawing said nut from engagement at the end of a feeding movement and for bringing it into engagement at the end of a retracting movement.

5. In a machine of the class described, in combination, a cutter-head, upright guides therefor, a cross-head above the travel of the cutter-head, a threaded shaft extending above the cross-head and driven from its lower portion, a nut adapted to engage said shaft or to be withdrawn therefrom, a retracting means, and connecting rods between said cutter-head and nut and connected directly to said retracting means.

6. In a machine of the class described, in combination, a cutter-head, upright guides therefor, a cross-head above the travel of the cutter-head, a threaded shaft extending above the cross-head and driven from its lower portion with an upward thrust bearing on the under side of the cross-head and a nut engaging said shaft and attached to the cutter-head for feeding the latter downward.

7. In a machine of the class described, in combination, a cutter-head, feeding means for the latter, a driven retracting shaft, pulleys on said shaft, flexible connections from the head engaging said pulleys and means for frictionally connecting said shaft with said pulleys to permit the feeding of the head forward and to retract the same when released from the feeding means.

8. In a machine of the class described, in combination, a cutter-head, feeding means for the latter, a driven retracting shaft, a pair of connected sprocket wheels thereon, sprocket chains from the head engaging said sprocket wheels, and a friction clutch between the shaft and the pair of sprocket wheels to permit the feeding of the head forward and to retract the same when released.

9. In a machine of the class described, in combination, a cutter-head, a constantly driven feed shaft, a constantly driven retracting shaft and connections from said shafts to the cutter-head adapted to cause a retraction of the same when released from the feed shaft and a feeding movement without release from the retracting shaft.

10. In a machine of the class described, in combination, a cutter-head, a feed shaft, a main driving shaft, a chain and sprockets connecting said shafts, a guard for said chain and for the sprocket of the main shaft, said guard extending a desired distance toward the feed shaft, and a tension roller carried by an adjustable part of said guard and engaging the chain.

11. In a machine of the class described, in combination, a base and uprights for guiding the cutters, a horizontal main shaft below, a feed shaft above for feeding the cutters, a chain and sprockets connecting said shafts and a guard for said chain and for the sprocket of the main shaft and extending upward to a level above the usual height of the work.

12. In a machine of the class described, in combination, a vertical spindle for rotating the work, a centering pin carried on said spindle and a socket held above said spindle and driven thereby and adapted to embrace and rotate the work while it is held centered on said pin and a yieldingly supported centering pin engaging the opposite end of the work.

13. In a machine of the class described, in combination, a vertical spindle for rotating the work, a centering pin 43 removably supported on the top of said spindle, a head 45 on said spindle, a socket for engaging the head of a blank and a ring carrying said socket and rotated by said head 45 with lateral freedom to adjust the socket to the position of the head and a yieldingly supported centering pin engaging the end of the blank opposite said head.

14. In a machine of the class described, in combination, a cutter-head, uprights between which said cutter-head travels, and a blank holding device above said cutter-head, movable between said uprights and adapted to be clamped to the latter in position to engage the work and hold it centered during the operation of the cutter-head.

15. In a machine of the class described, in combination, a cutter-head, uprights between which said cutter-head travels, and a blank holding device above said cutter-head, movable between said uprights and adapted to be clamped to the latter in position to engage the work and hold it centered during the operation of the cutter-head, a support including a centering pin engaging the lower end of the blank and means for rotating the blank thus centered.

16. In a machine of the class described, in combination, a cutter-head, uprights between which said cutter-head travels, and a blank holding device above said cutter-head, movable between said uprights and adapted to be clamped to the latter in position to engage the work and hold it centered during the operation of the cutter-head, a support including a centering pin engaging the lower end of the blank and a polygonal socket adapted to engage a head on the lower end of the blank and to rotate the latter while supported on said centering pin.

17. In a machine of the class described, in combination, a cutter-head adapted to traverse the body of a blank and a chamfering cutter mounted to be shifted into engagement with the work or out of such engagement and beyond the path of the cutter-head.

18. In a machine of the class described, in combination, a cutter-head adapted to traverse the body of a blank, and a facing cutter adapted to face the head of the blank and to be shifted into engagement with the work or out of such engagement and beyond the path of the cutter-head.

19. In a machine of the class described, in combination, a cutter-head adapted to traverse the body of a blank, a chamfering cutter adapted to engage the end of the blank, a facing cutter adapted to face the head of the blank and means for simultaneously moving them to operative position.

20. In a machine of the class described, in combination, a cutter-head adapted to traverse the body of a blank, a pointing cutter adapted to engage the end of the blank and a facing cutter adapted to face the head of the blank and means for simultaneously moving the pointing cutter and the facing cutter into and out of engagement with the work.

21. In a machine of the class described in combination, a cutter-head adapted to traverse the body of a blank, a pointing cutter adapted to engage the end of the blank and a facing cutter adapted to face the head of the blank and a rock shaft on which the pointing cutter and the facing cutter are mounted.

22. In a machine of the class described in combination, a cutter-head adapted to traverse the body of a blank, a pointing cutter adapted to engage the end of the blank and a facing cutter adapted to face the head of the blank and a rock shaft on which the pointing cutter and the facing cutter are mounted at an adjustable distance to correspond to blanks of different lengths.

23. In a machine of the class described, in combination, a cutter-head adapted to traverse the body of a blank, a pointing cutter adapted to engage the end of the blank and a facing cutter adapted to face the head of the blank, said pointing and facing cutters being mounted in rocking arms, a rock shaft carrying said arms, and an additional brace connecting said arms.

24. In a machine of the class described, in combination, a cutter-head, upright guides therefor, a cross-head above the travel of the cutter-head, a threaded shaft extending above the cross-head and a nut engaging said shaft and attached to the cutter-head, said cross-head having an opening through which the nut can pass.

25. In a machine of the class described, in combination, a cutter-head, upright guides therefor, a cross-head above the travel of the cutter-head, a threaded shaft extending above the cross-head and driven from its lower portion with an upward thrust bearing on the under side of the cross-head and a nut engaging said shaft and attached to the cutter-head for feeding the latter downward, said cross-head having an opening through which the nut can pass substantially down to said bearing.

In witness whereof, I have hereunto signed my name.

JAMES A. EDEN Jr.